(12) United States Patent
Zeira et al.

(10) Patent No.: US 6,981,108 B1
(45) Date of Patent: Dec. 27, 2005

(54) METHOD FOR LOCKING SHARED RESOURCES CONNECTED BY A PCI BUS

(75) Inventors: Assaf Zeira, Shoham, IL (US); Rony Gotesdyner, Givat Shmuel (IL)

(73) Assignee: P-Cube Ltd., Herzliya (IL)

( * ) Notice: Subject to any disclaimer, the term of this patent is extended or adjusted under 35 U.S.C. 154(b) by 431 days.

(21) Appl. No.: 10/047,499

(22) Filed: Oct. 23, 2001

(51) Int. Cl.[7] ............. G06F 12/14; G06F 13/14
(52) U.S. Cl. ............. 711/152; 710/200; 707/8; 709/248
(58) Field of Search ............. 711/152, 147, 148, 711/150, 155, 163, 216, 168; 710/200, 108; 709/213–214, 709/226, 229, 248, 400, 104; 707/8; 718/104

(56) References Cited

U.S. PATENT DOCUMENTS

| | | | | |
|---|---|---|---|---|
| 5,142,676 A | * | 8/1992 | Fried et al. ............. | 711/152 |
| 5,535,365 A | * | 7/1996 | Barriuso et al. ............. | 711/155 |
| 5,613,139 A | * | 3/1997 | Brady ............. | 710/200 |
| 5,987,550 A | * | 11/1999 | Shagam ............. | 710/119 |
| 6,076,126 A | * | 6/2000 | Shagam ............. | 710/108 |

\* cited by examiner

Primary Examiner—Denise Tran
(74) Attorney, Agent, or Firm—Abelman, Frayne & Schwab

(57) ABSTRACT

A computer system according to the present invention comprises at least two CPUs; at least one shared system resource accessible to each of the CPUs; and shared memory shared by the CPUs. The shared memory has therein a resource locking table, comprising memory elements. Each of the memory elements is designated for being written to by only one of the at least two CPUs. Each of the at least two CPUs is communicatively interconnected with the shared memory and the shared system resource, and the resource locking table is operative by each of the CPUs.

11 Claims, 3 Drawing Sheets ered by another CPU. Furthermore, the present invention is particularly related to a system wherein a resource memory table is used with memory resources dedicated for each processor and shared resource combination More specifically this invention is related to the case where, in such a multi processing system, the write and read operations of each processor are directed to specific memory elements in the resource memory table; for write operations, each processor is directed to access a single memory element per resource while for read operations each processor is directed to access two or more memory elements simultaneously, per shared resource. A memory element may be a bit, a byte, or otherwise an indivisible basic memory unit.

METHOD FOR LOCKING SHARED RESOURCES CONNECTED BY A PCI BUS

FIELD OF THE INVENTION

The present invention relates generally to a method for locking shared resources between multiple computer processors. More particularly, the present invention relates to a method for locking resources shared between computer processors which are connected by a PCI bus.

BACKGROUND OF THE INVENTION

Early computer systems, i.e. those which operate on a single task at a time, and use a single processor in a system, did not require any locking mechanism to prevent one task or processor from being accessed simultaneously by another task or processor. In many modern computer system, multiple processors, and, in some cases, multiple tasks in each processor, attempt to access a shared resource simultaneously. The problem with such simultaneous action is that, due to a certain sequence of events, the content of the resource, or the way it is handled, may be incorrect.

Therefore, processing systems having concurrently operating processors accessing certain shared resources must have a means for synchronizing such accesses. One way of implementing such a system is the busy-waiting strategy, in which each processor makes a request for a resource and waits idly until the resource is available. When the busy resource does eventually become available, one requesting processor gains access to the resource, while others continue to await an opportunity to access.

A process called "locking" has been widely used in the industry as a means for ensuring data integrity to better control accesses of tasks and processors to shared resources. The basic idea is to lock a resource against use by other tasks or processors, while a certain task or processor is using the resource. As a result of locking, the resource becomes unavailable to all tasks or processors other than the task or processor that initiated the lock. Upon completion of the requested task or tasks by the resource, the task or processor "unlocks" the resource, effectively opening it or making it available for use by other tasks or processors of the system. Multiple approaches of handling such cases have been suggested in prior art, many of which rely on a central controlling unit, or "interest manager", to handle the locking and permission setting for such locking mechanisms.

Many modern computer systems use a bus known as a Peripheral Component Interconnect (PCI) bus. The PCI buses have a locking mechanism, [LOCK#], to guarantee exclusive access to particular system resources whenever a device on the PCI bus requests ownership of the bus, or in other words, to perform an "atomic access", i.e. uninterruptible access, to a resource. When LOCK# is asserted, non-exclusive transactions must proceed to an address that is not currently locked, or otherwise wait until such lock is deactivated. A grant to start a transaction on the PCI bus does not guarantee control of LOCK#. Moreover, the system requires exclusivity on a region of 16 aligned bytes. The lock mechanism that controls LOCK# must be separately implemented. By assigning a resource a lock status, the mechanism will prevent the access to such locked resource.

Many modern processors provide support for locking mechanisms such as test-and-set, compare-and-swap, or fetch-and-add. Test-and-set(t) atomically (i.e. in a single step) reads the original value of "t" and sets it to "1". Compare-and-swap(a, b) atomically swaps the data values between "a" and "b". Fetch-and-add (x, n) atomically reads the original value of "x" and adds "n" to it.

As the known systems for locking mechanisms are relatively time consuming and complex, there clearly exists a need in the industry for providing a system and method for efficient resource-locking mechanism, specifically for the use in PCI-based or similar systems.

OBJECTS AND SUMMARY OF THE INVENTION

The present invention relates generally to systems where memory of one central processing unit (CPU) in a multiple processor system may be accessed by another CPU. Furthermore, the present invention is particularly related to a system wherein a resource memory table is used with memory resources dedicated for each processor and shared resource combination More specifically this invention is related to the case where, in such a multi processing system, the write and read operations of each processor are directed to specific memory elements in the resource memory table; for write operations, each processor is directed to access a single memory element per resource while for read operations each processor is directed to access two or more memory elements simultaneously, per shared resource. A memory element may be a bit, a byte, or otherwise an indivisible basic memory unit.

It should be understood that in the context of this invention, the term "CPU" is being used to include any sort of computational processing unit, including a network processor, a microprocessor, a microcontroller, and the like.

The present invention relates to a method for locking a resource which is shared by a plurality of processors. Each resource has a memory unit related to it and which can be automatically accessed, over PCI bus or by any other communication means having similar memory cycles characteristics, by the processors sharing the resource. Employing the method in a system such as that described results in a fast locking and unlocking mechanism.

A specific example of such a bus is that of the PCI bus. Even more specifically the invention relates to a system comprised of multiple packet processors in service aware networks (SAN) where wire-speed performance is essential to ensure high quality of network service.

It is a purpose of this invention to provide an improved apparatus and method for efficiently locking resources connected to multiple processors over a PCI bus or over any other communication means having the same or similar memory cycle characteristics. An exemplary embodiment of a computer system embodying the present invention comprises at least two CPUs, shared memory, at least one shared system resource and a resource-locking table provided in the shared memory, wherein each of the CPUs is communicatively interconnected with the shared memory and the shared system resource, and the resource locking table is operative by each of the CPUs.

DETAILED DESCRIPTION OF THE INVENTION

Figure 1:
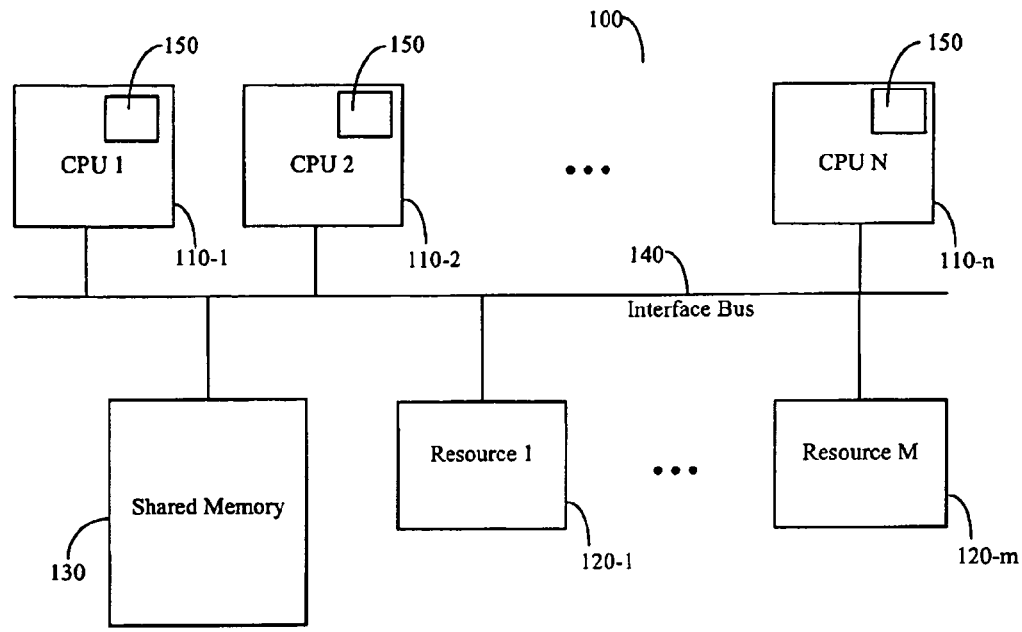
FIG. 1 is a diagram of an exemplary of a PCI-bus based computer system.

With reference to FIG. 1, a system 100 contains multiple processing units CPU1 to CPU N (hereinafter CPUs) 110-1–110-n, where N is 2 or greater (thus at least two CPUs are required). CPUs 110 are connected via PCI bus 140, or any other communication means having similar memory cycles characteristics, i.e. where the write operation can be atomically performed to a single memory element while a read can access at least two or more elements simultaneously. However, it should be noted that bytes are used herein only for the purpose of example, and any basic memory element can be used. Each CPU 110 has, in addition to its own memory, access to shared memory 130 which is accessible by the other CPUs 110, and which is also connected to PCI bus 140. In some embodiments of this invention shared memory 130 may be part of the memory of a CPU. In addition, at least one shared system resource 120 is also connected to PCI bus 140. At times, one of CPUs 110, specifically CPU 110-1 for purposes of this example, may wish to request exclusive access to a shared resource, for example, resource 120-1, i.e. simultaneously prevent any other CPU 110-2–110-n, to connect with shared resource 120-1, but without disrupting the possibility of use of other shared resources 120-2–120-m. In accordance with the present invention, each CPU 110is provided with control commands 150 that allow for the implementation of a locking mechanism that will prevent access of any other CPU 110 to shared resource 120 while it is being exclusively used by CPU 110-1. The operation of CPUs 110 may be totally independent from one another and CPU 110-1 may use data provided by shared resource 120-1 at a rate that is not under the control of any of the other CPUs.

In an exemplary embodiment of the present invention, where N=4, CPUs 110-1 through 110-4 are connected to PCI bus 140. A portion of shared memory 130 is assigned for the purpose of use in conjunction with the locking mechanism control commands 150.

Figure 2:
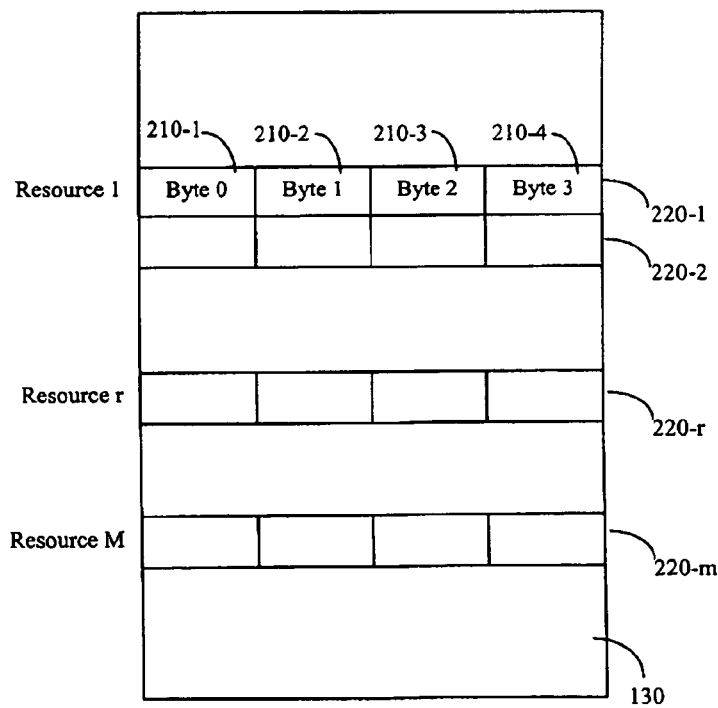
FIG. 2 is a diagram of shared memory which may be used for purposes of locking shared resources in accordance with an exemplary embodiment of the present invention.

A schematic diagram of shared memory 130 is shown in FIG. 2. The portion of shared memory 130 which is dedicated to locking mechanism control commands 150 is divided into ownership rows 220; one ownership row for each resource, i.e. row 220-1 is dedicated to the first shared resource, row 220-r to the $r^{th}$ resource, and row 220-m to the last shared resource. In the case where four CPUs are used (i.e., n=4), each byte of a four-byte double word, is used as an owner field for a specific CPU 110. Hence, byte 0 210-1 corresponds to CPU 110-1, and byte 1 210-2 corresponds with CPU 110-2, and so on. This should be understood as, the column of byte 0 corresponds to CPU 110-1, the column of byte 1 to CPU 110-2 and so on. It should be noted that the number of bytes in each row is limited only by the maximum number of bytes that CPUs 110 and bus 140 can handle as an atomic read operation. For example, systems capable of handling 8-bytes, could handle eight CPU 110 using the disclosed invention.

A description for an exemplary embodiment employing a hierarchical approach for systems having more CPUs than can be handled by reading one memory row atomically is disclosed below. A CPU 110 claiming exclusive ownership, or requesting to lock resource 120, for example, for its sole use, first performs a sequence of actions designed to ensure a successful lock without contention with other CPUs 110, and at the end of the process relinquishes the lock from resource 120-1, making it available for use by other CPUs 110. Moreover, although the example relates to a memory row of 32-bits (4 bytes), the system can be easily modified by one of ordinary skill in the art to be used with memory rows of larger or smaller numbers of bytes, for example, 2 bytes, 8 bytes, 16 bytes, etc. or any number of bytes as long as a read operation can be performed atomically, as explained above.

Figure 3:
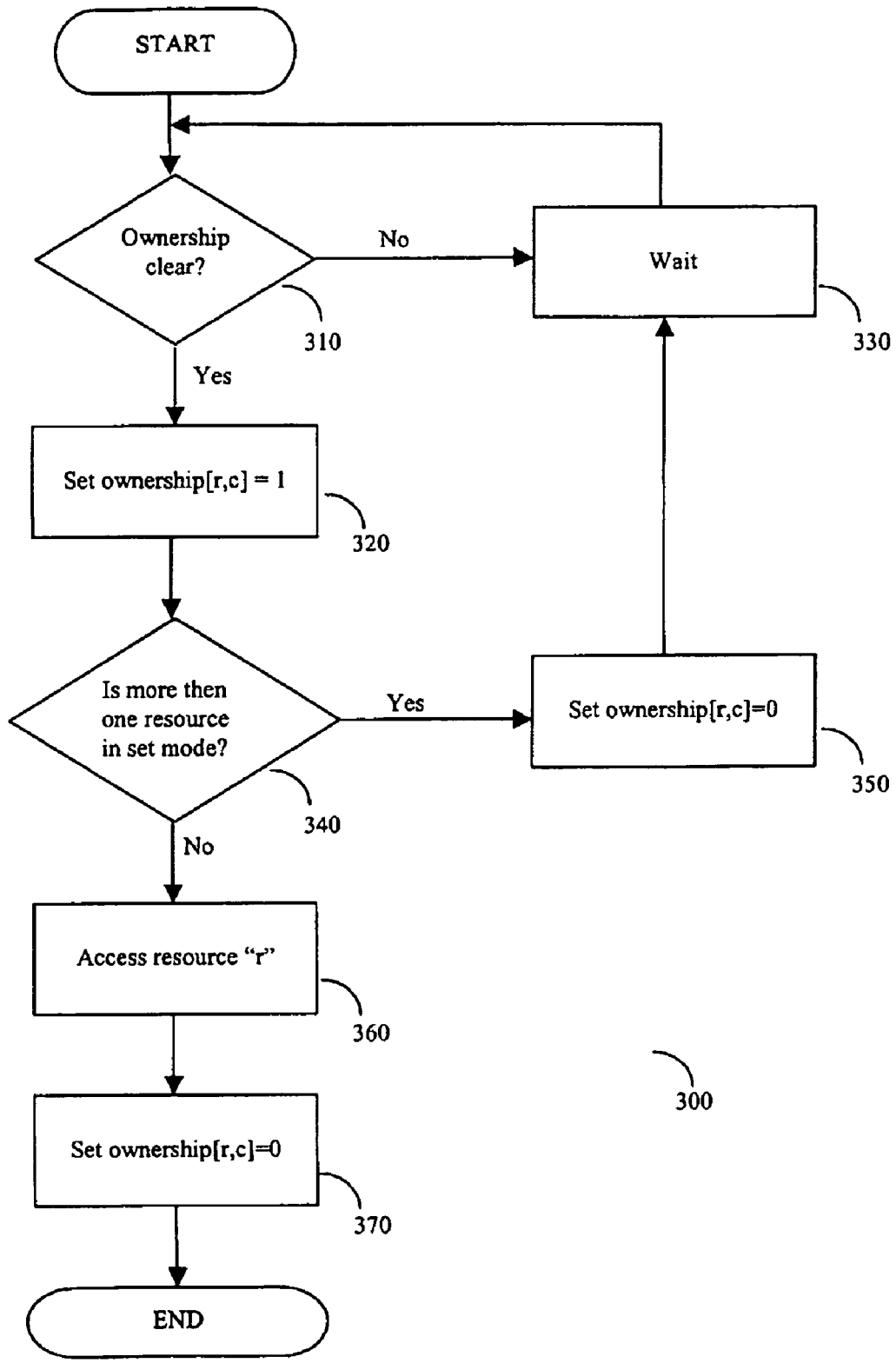
FIG. 3 is a flow chart of an exemplary embodiment of the shared resource locking mechanism of the exemplary embodiment.

The flow chart in FIG. 3 describes the sequence of steps, according to an exemplary embodiment of the present invention, for achieving a secure lock of a resource 120 for use by CPU 110 (" c"). In checking step 310, the ownership row 210 corresponding to resource 120 ("r") to be accessed is checked. If the contents of any of the bytes 210-1–210-n is anything other than "0" then the requesting CPU 110-c waits in step 330 before attempting to check ownership row 210-r for another time. A person skilled in the art could program the wait time to correspond to any number of parameters, including the priority of the request, the number of CPU 110 among all other CPUs 110, the frequency of request for a lock by CPU 110, the type of resource 120, and others. However, if ownership row 220-r is clear, then the system may proceed to locking step 320 where byte 210-c, corresponding to CPU 110-c which is attempting to lock resource 120-r in ownership row 220-r, is set to "1". Since CPU 110-c has a designated byte 210-c in ownership row 210-r, there is no possibility of contention or override by another CPU 110. In recheck step 340 ownership row 220-r is checked to ensure that only one CPU 110 has locked resource "r". If that is not the case, i.e. if another CPU 110 has simultaneously set ownership in its ownership byte 210 to 1, then control is transferred to conflict clearing step 350 where all the bytes 210-1–210-n corresponding to the requesting CPUs 110are cleared, followed by a wait period in waiting step 330. When CPU 110 has reached recheck step 340 and received a "No" answer, then resource 120-r is considered locked, or otherwise exclusive for the use by CPU 110-c, in access step 360. Once CPU 110-c has completed its use of resource 120-r, CPU 110-c relinquishes the lock over resource 120-r, by clearing byte 210-c in row 220-r.

In system 100 the locking operation requires four PCI transactions: a) read operation in step 310; b) write operation in step 320; c) read operation in step 340; and d) write operation in step 370 (assuming that a simultaneous conflicting request has not been made, triggering step 350.

Figure 4:
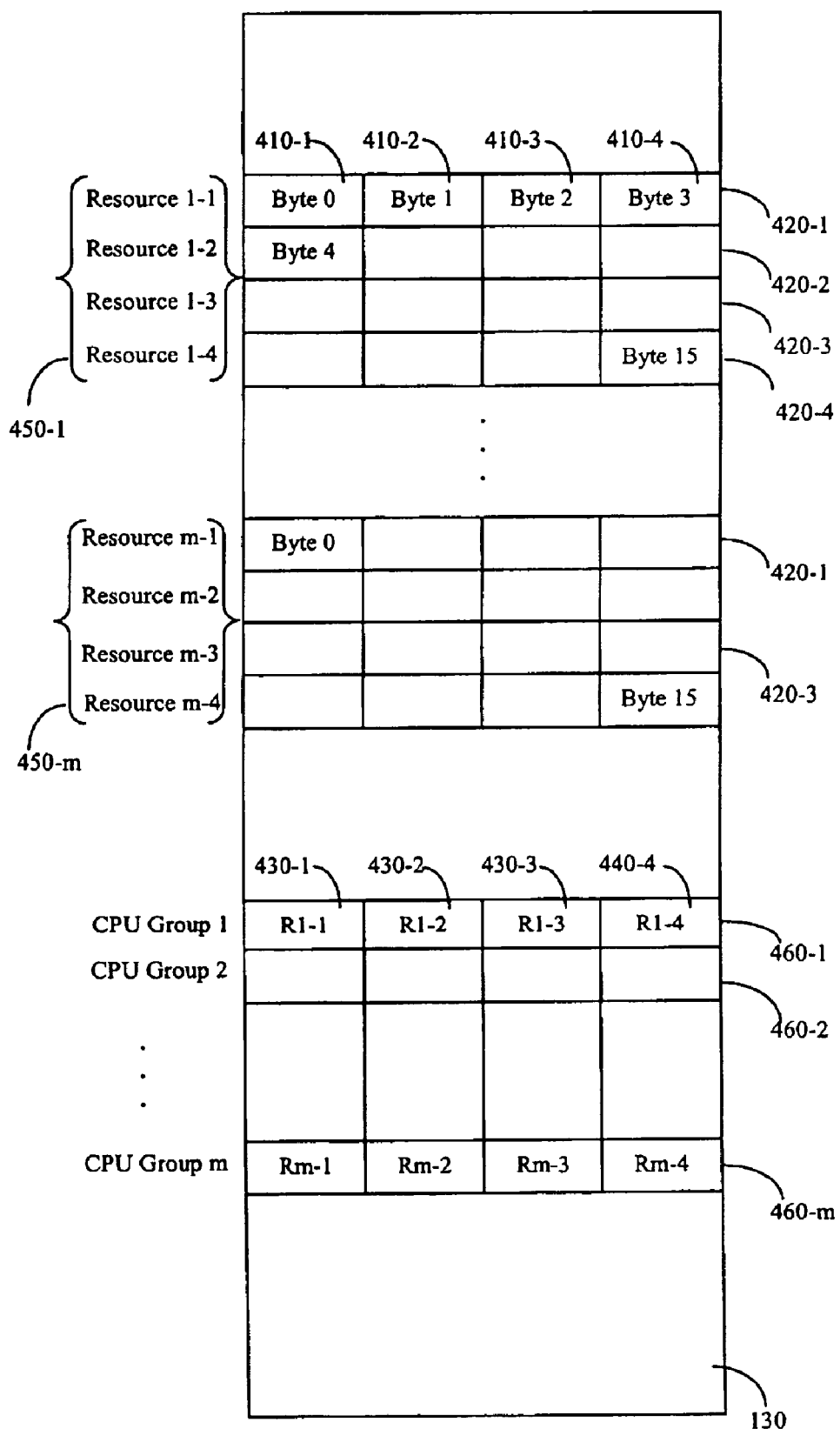
FIG. 4 is a diagram of an exemplary embodiment of shared memory used for locking shared system resources in accordance with an exemplary embodiment of the system of the present invention.

FIG. 4 shows an exemplary embodiment in which shared memory 130 is organized for implementation of a hierarchical locking system allowing for up to sixteen CPUs 110. This embodiment may be required in system 100 where bus 140 is limited to reading atomically a maximum of four aligned bytes, for example. In this example, sixteen CPUs 110 are grouped in groups of four CPUs. A table 470 have rows 460-1 through 460-m, i.e., one row per resource 120. Each row 460 contains four bytes 430, each byte corresponding to a group of four CPUs 110. Byte 430-1 corresponds to CPU 110-1 through 110-4, byte 430-2 corresponds to CPUs 110-5 through 110-8, and so on. A table 450 having rows 420 is further provided. A group 450, corresponding to a single resource 120 is comprised of four rows 420. Each row 420 contains four bytes 410, each such byte 410 corresponding with a single CPU. Hence is CPU 110-1 wishes to access resource 120-1 then the first byte 410-1 of row 420-1 of group 450-1 is set to "1" and correspondingly, the first byte 430-1 of row 460-1 of table 470 is set to "1". Therefore, in order to determine the use of resource 120-1, it is sufficient to read row 460-1 and if any memory element within row 460-1 is set to "1", then the resource is identified as being in use and unavailable. This exemplary embodiment can be easily modified by one skilled in the art to fit implementation of 2-byte, 8-byte, 16-byte, or otherwise any other implementation allowing for an atomic read of a single row.

Thus the locking procedure takes place in two steps: a) choosing the CPU group 430 for a particular resource; and b) locking the resource for a specific CPU 110. Therefore steps 310, 320 and 340 shown in FIG. 3 must be repeated twice, once for step a) above and then for step b) above. Similarly, upon release of a resource, first the byte in 410 is reset, followed by the byte in 430. The algorithm presented in FIG. 3 can now be easily modified by a person skilled in the art, to accommodate for this change. The hierarchy may continue any depth as may be deemed necessary. Moreover, the examples relate to a memory row of 32-bits, however, the system can be easily modified by one of ordinary skill in the art to be used with memory rows of larger or smaller numbers of bytes, for example, 2 bytes, 8 bytes, 13 bytes, 16 bytes, etc. provided that the write operation can be atomically performed. Additionally, it should be understood that the invention can be configured for a different number of CPUs than that shown in the exemplary embodiment. It should also be noted that it is always possible to use fewer CPUs than the maximum shown in each embodiment.

Further modifications and alterations may also be made to the exemplary embodiments of the invention as described herein by one of skill in the art without departing from the spirit or scope of the invention as claimed in the appended claims.

We claim:

1. A computer system comprising:
   at least two CPUs;
   shared memory, which is shared by said at least two CPUs; and
   at least one shared system resource accessible to said at least two CPUs,
   said shared memory having therein a resource locking table, comprising memory elements, each of said memory elements designated for being written to by only one of said at least two CPUs,
   each CPU of said at least two CPUs having a corresponding memory element for each of said at least one shared system resource to which it has access,
   wherein each of said at least two CPUs is communicatively interconnected with said shared memory and said at least one shared system resource,
   wherein said resource locking table is operative by each of said at least two CPUs, and
   wherein any of said at least two CPUs can read a first collection of memory elements in a single transaction, said first collection of memory elements corresponding to requests of received from said at least two CPUs for one of said at least one shared system resource, and
   wherein a CPU of said at least two CPUs locks a said at least one shared system resource by executing at least one control command to accomplish the steps of:
   a. checking a content of said first collection of memory elements of said shared memory and if each memory element of said first collection of memory elements is not clear, waiting for each of said first collection of memory elements to clear;
   b. setting said corresponding memory element for each CPU of said at least two CPUs;
   c. checking if more than one of said memory elements of said first collection of memory elements is set, and if true then resetting said corresponding memory element for each CPU of said at least two CPUs and waiting for each of said memory elements of said first collection of memory elements to reset and repeating the sequence from step a.;
   d. accessing said at least one shared system resource corresponding to said first collection of memory elements; and
   e. resetting said corresponding memory element, corresponding to said at least two CPUs, of said first collection of memory elements corresponding to said at least one shared system resource.

2. The computer system according to claim 1, wherein a second collection of memory elements corresponds to a group of CPUs.

3. A computer system comprising:
   at least two CPUs;
   shared memory, which is shared by said at least two CPUs; and at least one shared system resource accessible to said at least two CPUs,
   said shared memory having therein a resource locking table, comprising memory elements, each of said memory elements designated for being written to by only one of said at least two CPUs,
   each CPU of said at least two CPUs having a corresponding memory element for each of said at least one shared system resource to which it has access,
   wherein each of said at least two CPUs is communicatively interconnected with said shared memory and said at least one shared system resource,
   wherein said resource locking table is operative by each of said at least two CPUs, and
   wherein any of said at least two CPUs can read a first collection of memory elements in a single transaction, said first collection of memory elements corresponding to requests of received from said at least two CPUs for one of said at least one shared system resource, and
   wherein a second collection of memory elements corresponds to a group of CPUs, and
   wherein said CPU group locks said at least one shared system resource by executing at least one control command to accomplish the steps of:
   a. checking a first content of said second collection of memory elements and, if not clear, waiting for each memory element of said second collection of memory elements to clear;
   b. setting said memory element of said second collection of memory elements corresponding to said CPU group;
   c. checking if more than one of said memory elements of said second collection of memory elements is set, and if true then resetting said second collection of memory elements corresponding to said CPU group and waiting for each of said memory elements of said second collection of memory elements to reset and repeating the sequence from step a.;
   d. checking a second content of said first collection of memory elements corresponding to said at least one shared system resource and said CPU group and if not clear, waiting for each memory element of said first collection of memory elements to clear;
   e. setting said corresponding memory element of said first collection of memory elements corresponding to said CPU group;

f. checking if more than one of said memory elements of said first collection of memory elements is set, and if true then resetting said second collection of memory elements corresponding to said CPU group and waiting for each memory element of said memory elements of said first collection of memory elements to reset and repeating the sequence from step a.;

g. accessing said at least one shared system resource corresponding to said first collection of memory elements;

h. resetting said corresponding memory element, corresponding to said CPU group, of said first collection of memory elements corresponding to said at least one shared system resource; and i. resetting said corresponding memory element, corresponding to said CPU group, of said second collection of memory elements corresponding to said at least one shared system resource.

4. A method for locking a shared system resource for use by a single CPU, the method comprising the steps of:

a. checking a content of a collection of memory elements of a resource locking table implemented in shared memory and if each memory element of said collection of memory elements is not clear, waiting for each of said collection of memory elements to clear;

b. setting said corresponding memory element of said collection of memory elements corresponding to the single CPU;

c. checking if more than one of said memory elements of said collection of memory elements is set, and if true then resetting said corresponding memory element corresponding to the single CPU and waiting for each of said memory elements of said collection of memory elements to reset and repeating the sequence said from step a;

d. accessing said shared system resource corresponding to said collection of memory elements; and e. resetting said corresponding memory element, corresponding to the single CPU, of said collection of memory elements corresponding to said shared system resource.

5. The method according to claim 4, wherein said shared memory is connected to a PCI bus.

6. A method for locking a shared system resource for use by a single CPU having access to a first and a second collection of memory elements of shared memory, the method comprising the steps of:

a. checking a first content of said second collection of memory elements and if not clear, waiting for each memory element of said second collection of memory elements to clear;

b. setting a corresponding memory element of said second collection of memory elements corresponding to a CPU group;

c. checking if more than one of said memory elements of said second collection of memory elements is set, and if true, resetting said corresponding memory element corresponding to said CPU group and waiting for each of said memory elements of said second collection of memory elements to reset and repeating said checking step of step a.;

d. checking a second content of said first collection of memory elements corresponding to said shared system resource and said CPU group and, if not clear, waiting for each memory element of said first collection of memory elements to clear;

e. setting said corresponding memory element of said first collection of memory elements corresponding to said CPU group;

f. checking if more than one of said memory elements of said first collection of memory elements is set, and if true then resetting said corresponding memory element corresponding to said CPU group and waiting for each of said memory elements of said first collection of memory elements to reset and repeating said checking step of step a.;

g. accessing said shared system resource corresponding to said first collection of memory elements;

h. resetting said corresponding memory element, corresponding to said CPU group, of said first collection of memory elements corresponding to said shared system resource; and i. resetting said corresponding memory element, corresponding to said CPU group, of said second collection of memory elements corresponding to said shared system resource.

7. The method according to claim 6, wherein said shared memory is connected to a PCI bus.

8. A computer program product for locking a shared system resource for use by a single CPU, the computer program product comprising:

computer readable medium having thereon software instructions for enabling a system, containing at least two CPUs and at least one shared system resource, to perform predetermined operations comprising the steps of:

a. checking a content of a collection of memory elements of a resource locking table implemented in shared memory and if each memory element of said collection of memory elements is not clear, waiting for each of said collection of memory elements to clear;

b. setting each memory element of said collection of memory elements corresponding to the single CPU;

c. checking if more than one of said memory elements of said collection of memory elements is set, and if true then resetting each memory element of said collection of memory elements corresponding to the single CPU and waiting for each of said collection of memory elements to reset and repeating the sequence from step a.;

d. accessing said shared system resource corresponding to said collection of memory elements; and e. resetting each memory element of said corresponding memory elements, corresponding to the single CPU, of said collection of memory elements corresponding to said shared system resource.

9. The computer program product according to claim 8, wherein said at least two CPUs and said shared memory are connected by a PCI bus.

10. A computer program product for locking a shared system resource for use by a single CPU having access to a first and a second collection of memory elements of at least one shared memory, the computer program product comprising:

computer readable medium having thereon software instructions for enabling a system, containing at least two CPUs and at least one shared system resource, to perform predetermined operations, comprising the steps of:

a. checking a first content of said second collection of memory elements and if not clear, waiting for each memory element of said second collection of memory elements to clear;

b. setting each memory element of said second collection of memory elements corresponding to a CPU group;

c. checking if more than one of said memory elements of said second collection of memory elements is set, and if true then resetting each memory element corresponding to said CPU group and waiting for each memory element of said second collection of memory elements to reset and repeating the sequence from step a.;

d. checking a second content of said first collection of memory elements residing in a resource locking table implemented in said at least one shared memory and further corresponding to said shared system resource and said CPU group and, if not clear, waiting for each memory element of said first collection of memory elements to clear;

e. setting each memory element of said first collection of memory elements corresponding to said CPU group;

f. checking if more than one memory element of said first collection of memory elements is set, and if true then resetting each memory element corresponding to said CPU group and waiting for each memory element of said first collection of memory elements to reset and repeating the sequence from step a.;

g. accessing said shared system resource corresponding to said first collection of memory elements;

h. resetting each memory element, corresponding to said CPU group, of said first collection of memory elements corresponding to said shared system resource; and i. resetting each memory element, corresponding to said CPU group, of said second collection of memory elements corresponding to said shared system resource.

11. The computer program product according to claim 10, wherein said at least two CPUs and said at least one shared memory are connected by a PCI bus.

\* \* \* \* \*